(12) United States Patent
Ko et al.

(10) Patent No.: US 9,307,176 B2
(45) Date of Patent: Apr. 5, 2016

(54) DISPLAY APPARATUS, UPGRADE APPARATUS, DISPLAY SYSTEM AND CONTROL METHOD OF THE SAME

(71) Applicant: SAMSUNG ELECTRONICS CO., LTD., Suwon-si (KR)

(72) Inventors: Chang-seog Ko, Hwaseong-si (KR); Jung-geun Kim, Suwon-si (KR); Jun-sik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 615 days.

(21) Appl. No.: 13/716,807

(22) Filed: Dec. 17, 2012

(65) Prior Publication Data
US 2013/0169872 A1    Jul. 4, 2013

(30) Foreign Application Priority Data
Dec. 30, 2011  (KR) .................... 10-2011-0147745

(51) Int. Cl.
| | |
|---|---|
| H04N 5/44 | (2011.01) |
| G06F 9/44 | (2006.01) |
| H04N 21/418 | (2011.01) |
| H04N 21/442 | (2011.01) |
| H04N 21/443 | (2011.01) |
| H04N 21/45 | (2011.01) |
| H04N 21/458 | (2011.01) |

(Continued)

(52) U.S. Cl.
CPC .. *H04N 5/44* (2013.01); *G06F 1/26* (2013.01); *G06F 9/4401* (2013.01); *H04N 21/4183* (2013.01); *H04N 21/4184* (2013.01); *H04N 21/4432* (2013.01); *H04N 21/4436* (2013.01); *H04N 21/44231* (2013.01); *H04N 21/4516* (2013.01); *H04N 21/4586* (2013.01); *H04N 21/818* (2013.01); *H04N 21/8166* (2013.01); *G06F 8/65* (2013.01)

(58) Field of Classification Search
CPC . H04N 5/44; H04N 21/4184; H04N 21/8173; H04N 21/4586; H04N 21/436
See application file for complete search history.

(56) References Cited

U.S. PATENT DOCUMENTS

| | | | |
|---|---|---|---|
| 6,469,742 B1 | 10/2002 | Trovato et al. | |
| 8,250,274 B2 * | 8/2012 | Matsui | 713/300 |

(Continued)

FOREIGN PATENT DOCUMENTS

WO    2004/051390 A2    6/2004

OTHER PUBLICATIONS

Communication dated Nov. 24, 2014 issued by the European Patent Office in counterpart European Application No. 12198239.1.

(Continued)

*Primary Examiner* — Huy T Nguyen
(74) *Attorney, Agent, or Firm* — Sughrue Mion, PLLC (57) ABSTRACT

A display apparatus is provided, including: an image processor which processes an image signal received from an image source according to a preset image processing process and displays an image on a display; an upgrade apparatus which upgrades the image processing process when connected to the display apparatus; a power supply which supplies power of the display apparatus; and a controller which controls the power supply to supply power to the upgrade apparatus through the connector before supplying power to the image processor in response to a determination that the upgrade apparatus is connected to the display apparatus.

26 Claims, 8 Drawing Sheets

(51) Int. Cl.
*H04N 21/81* (2011.01)
*G06F 1/26* (2006.01)
*G06F 9/445* (2006.01)

(56) References Cited

U.S. PATENT DOCUMENTS

2004/0025069 A1 2/2004 Gary et al.
2007/0049058 A1* 3/2007 Kobayashi .................... 439/13
2007/0101116 A1 5/2007 Tsuji
2008/0036919 A1* 2/2008 Lee .............................. 348/739
2009/0031387 A1 1/2009 Boyden et al.
2010/0115150 A1* 5/2010 Hachiya ......................... 710/19
2010/0208136 A1* 8/2010 Castano ........................ 348/553
2011/0022826 A1 1/2011 More et al.
2011/0080485 A1* 4/2011 Kimoto et al. ............... 348/192

OTHER PUBLICATIONS

Communication, dated Apr. 26, 2013, issued by the European Patent Office in counterpart European Patent Application No. 12198239.1.

* cited by examiner

DISPLAY APPARATUS, UPGRADE APPARATUS, DISPLAY SYSTEM AND CONTROL METHOD OF THE SAME

CROSS-REFERENCE TO RELATED APPLICATION

This application claims priority from Korean Patent Application No. 10-2011-0147745, filed on Dec. 30, 2011 in the Korean Intellectual Property Office, the disclosure of which is incorporated herein by reference.

BACKGROUND

1. Field

Apparatuses and methods consistent with exemplary embodiments relate to a display apparatus which processes an image signal provided from an image source according to a preset image processing process to display an image, an upgrade apparatus upgrading the display apparatus, a display system including the display apparatus and the upgrade apparatus, and a control method of the same, and more particularly to a display apparatus which increases a booting speed when the display apparatus and an upgrade apparatus are connected to each other, an upgrade apparatus, a display system, and a control method of the same.

2. Description of the Related Art

A display apparatus is a device which processes image signals/image data and presents images on a display panel provided therein. Available display apparatuses for general users may include a television (TV) and a monitor. For example, a display apparatus provided as a TV processes broadcast signals transmitted from external sources according to various types of image processing, e.g., decoding and scaling, to offer images of broadcast channels desired by users.

The display apparatus has an embedded image processing board configured as a circuit including various kinds of chip sets and a memory to conduct such image processing. However, due to various factors, such as advances in technology and changes in demand, there is increasingly required a display apparatus which can be improved and upgraded in terms of hardware and software over the lifetime of the display apparatus.

To upgrade the hardware of related display apparatuses, the whole or at least part of the image processing board embedded in the display apparatus is replaced, which is not easy in view of manufacture and use. Also, to run advanced software, hardware designed corresponding to the software is needed. In the end, a user of a related display apparatus may need to purchase a new upgraded display apparatus.

SUMMARY

According to an aspect of an exemplary embodiment there is provided a display apparatus including: a display; an image processor which process an image signal received from an image source according to a preset image processing process and displays an image on the display; a connector which provides a connection to an upgrade apparatus, wherein the upgrade apparatus upgrades the preset image processing process; a power supply which supplies power to the display apparatus; and a controller which controls the power supply to supply power to the upgrade apparatus in response to a determination that the upgrade apparatus is connected to the connector.

The controller may control the power supply to supply power to the image processor before supplying power to the connector in response to a determination that the upgrade apparatus is not connected to the connector, and the controller may control the power supply to supply power to the connector before supplying power to the image processor in response to a determination that the upgrade apparatus is connected to the connector.

The controller may store flag information indicating whether the upgrade apparatus in response to a determination that the upgrade apparatus is connected to the connector in response to the display apparatus receiving a signal to turn off, and the controller may determine whether the upgrade apparatus is connected to the connector according to whether the flag information is stored when the display apparatus starts booting.

The controller may determine that the upgrade apparatus is connected to the connector when there is the flag information at a time when the display apparatus starts booting, and the controller may determine that the upgrade apparatus is not connected to the connector when there is no flag information at a time when the display apparatus starts booting.

The connector may include a plurality of connection terminals, and the controller may supply power to at least one connection terminal connected to the upgrade apparatus among the connection terminals before supplying power to the image processor.

The upgrade apparatus may perform a second process, the preset image processing process may include a first process, and the controller may control the upgrade apparatus to perform the second process and may control the image processor not to perform the first process.

According to an aspect of another exemplary embodiment there is provided an upgrade apparatus of a display apparatus including: a connector which provides a connection to the display apparatus which processes an image signal received from an image source according to a preset image processing process and displays an image; an image processor which upgrades the preset image processing process when the display apparatus is connected to the connector; and a controller which controls a power supply of the display apparatus to supply power of the display apparatus to the upgrade apparatus in response to a determination that the display apparatus and the upgrade apparatus are connected to each other.

The display apparatus may include an apparatus connector which provides a connection to the upgrade apparatus and an apparatus image processor which performs the preset image processing process, and the controller may control the power supply of the display apparatus to supply power of the display apparatus to the upgrade apparatus through the apparatus connector before supplying power to the apparatus image processor in response to a determination that the upgrade apparatus is connected to the display apparatus, and the controller may control the power supply of the display apparatus to supply power of the display apparatus to the apparatus image processor before supplying power to the apparatus connector in response to the determination that the display apparatus and the upgrade apparatus are not connected to each other.

The controller may store flag information indicating whether the upgrade apparatus is connected to the apparatus connector when the display apparatus receives a signal to turn off.

The apparatus connector may include a plurality of connection terminals, and the controller may control the power supply of the display apparatus to supply power to at least one connection terminal connected to the connector among the connection terminals before supplying power to the apparatus image processor.

The image processor may perform a second process, the preset image processing process may include a first process, and the controller may control the upgrade apparatus to perform, by the image processor, the second process and control the display apparatus not to perform the first process in response to a determination that the display apparatus is connected to the connector.

According to an aspect of another exemplary embodiment there is provided a control method of a display apparatus including a display and an image processor which processes an image signal received from an image source according to a preset image processing process and displays an image on the display, the control method including: connecting an upgrade apparatus which upgrades the preset image processing process to a connector of the display apparatus; supplying the power of the display apparatus to the upgrade apparatus in response to a determination that the upgrade apparatus is connected to the connector and upgrading the preset image processing process by the upgrade apparatus.

The supplying the power of the display apparatus to the upgrade apparatus may include supplying the power of the display apparatus to the upgrade apparatus through the connector before supplying power to the image processor in response to a determination that the upgrade apparatus is connected to the connector, and supplying the power of the display apparatus to the image processor before supplying power to the connector in response to a determination that the upgrade apparatus is not connected to the connector.

The control method may further include storing flag information indicating whether the upgrade apparatus is connected to the connector in response to a signal to turn off the display apparatus, and the determination of whether the upgrade apparatus is connected to the connector may include determining whether the flag information was stored.

The determining whether the upgrade apparatus is connected to the connector according to whether the flag information is stored may include determining that the upgrade apparatus is connected to the connector if there is the flag information when starting booting and determining that the upgrade apparatus is not connected to the connector if there is no flag information.

The connector may include a plurality of connection terminals, and the supplying the power of the display apparatus to the upgrade apparatus through the connector before supplying power to the image processor may include supplying power to at least one connection terminal connected to the upgrade apparatus among the connection terminals before supplying power to the image processor.

The upgrade apparatus may perform a second process, in preset image processing process may include a first process, and the upgrading the preset image processing process may include controlling upgrade apparatus to perform the second process and controlling the image processor not to perform the first process.

According to an aspect of another exemplary embodiment there is provided a control method of an upgrade apparatus of a display apparatus including: connecting the upgrade apparatus to the display apparatus which processes an image signal received from an image source according to a preset image processing process and displays an image; upgrading the preset image processing process when the upgrade apparatus is connected to the display apparatus; supplying power of the display apparatus to the upgrade apparatus in response to a determination that the display apparatus and the upgrade apparatus are connected to each other.

The display apparatus may include an apparatus connector connected to the upgrade apparatus and an apparatus image processor which performs the preset image processing process, and the supplying power of the display apparatus to the upgrade apparatus may include supplying power of the display apparatus to the upgrade apparatus through the apparatus connector before supplying power to the apparatus image processor in the display apparatus in response to a determination that the display apparatus and the upgrade apparatus are connected and supplying power of the display apparatus to the apparatus image processor before supplying power to the apparatus connector in response to a determination that the display apparatus and the upgrade apparatus are not connected to each other.

The control method may further include storing flag information indicating whether the display apparatus and the upgrade apparatus are connected and turning off power of the display apparatus in response to a signal to turn off the power of the display apparatus.

The apparatus connector may include a plurality of connection terminals, and the supplying power of the display apparatus may include supplying power to at least one connection terminal connected to the upgrade apparatus before supplying power to the apparatus image processor.

The upgrade apparatus may perform a second process, the preset image processing process may include a first process, and the upgrading the preset image processing process may include controlling the upgrade apparatus to perform the second process controlling the display apparatus not to perform the first process. According to an aspect of another exemplary embodiment there is provided a display system including: a display apparatus including a display, an image processor which processes an image signal received from an image source according to a preset image processing process and displays an image on the display, a connector which provides a connection to external devices, and a power supply which supplies power of the display apparatus; and an upgrade apparatus connected to the connector which upgrades the preset image processing process, wherein the power supply supplies power to the upgrade apparatus through the connector before supplying power to the image processor in response a determination that the upgrade apparatus is connected to the display apparatus.

According to an aspect of another exemplary embodiment there is provided an image processing apparatus, including: an image processor which processes an image signal received from an image source according to a preset image processing process and outputs an image to a display; a connector which provides a connection to an upgrade apparatus, wherein the upgrade apparatus upgrades the preset image processing process; a power supply which supplies power to the image processing apparatus; and a controller which controls the power supply to supply power to the upgrade apparatus in response to a determination that the upgrade apparatus is connected to the connector.

The controller may control the power supply to supply power to the image processor before supplying power to the connector in response to a determination that the upgrade apparatus is not connected to the connector, and the controller may control the power supply to supply power to the connector before supplying power to the image processor in response to a determination that the upgrade apparatus is connected to the connector.

The controller may store flag information indicating whether the upgrade apparatus is connected to the connector in response to the image processing apparatus receiving a signal to turn off, and the controller may determine whether the upgrade apparatus is connected to the connector according to whether the flag information is stored when the image processing apparatus starts booting.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
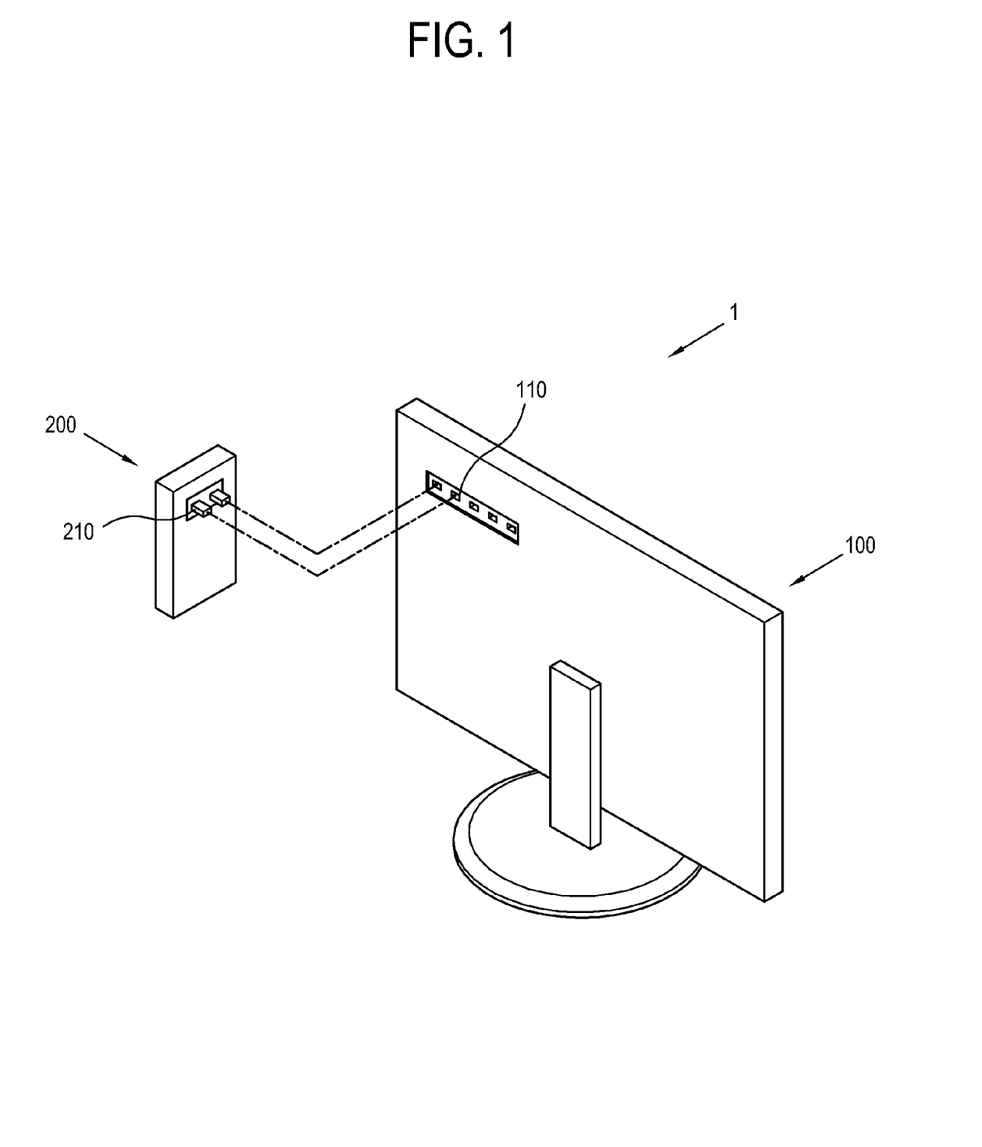
FIG. 1 shows an illustrative example of a display system according to an exemplary embodiment.

FIG. 1 shows an illustrative example of a display system 1 according to an exemplary embodiment.

As shown in FIG. 1, the display system 1 according to the present exemplary embodiment includes a display apparatus 100 processing an image signal provided from an external image source (not shown) according to a preset image processing process and displaying an image based on the image signal and an upgrade apparatus 200 upgrading hardware and/or software of the display apparatus 100.

In the system 1 of the present exemplary embodiment, the display apparatus 100 is configured as a TV which displays broadcast images based on broadcast signals/broadcast information/broadcast data received from a transmitter of a broadcasting station. However, the display apparatus 100 may be configured as various types of devices which are capable of displaying images, without being limited to a TV.

The display apparatus 100 may display any image, without being limited to broadcast images. For example, the display apparatus 100 may display images, such as videos based on signals/data received from various types of image sources (not shown), still images, applications, on-screen display (OSD), and graphic user interface (GUI) for controlling various operations.

The upgrade apparatus 200 is connected to and communicates with the display apparatus 100. The upgrade apparatus 200 upgrades existing hardware and/or software of the connected display apparatus 100 and enables an image signal to be processed by the upgraded hardware and/or software of the display apparatus 100, thereby displaying an image with improved quality.

The upgrade apparatus 200 may be connected to the display apparatus 100 via a cable or wirelessly. In the present exemplary embodiment, the upgrade apparatus 200 is connected to the display apparatus 100 via a cable, thereby enabling transmission and reception of data/information/signals/power between the upgrade apparatus 200 and the display apparatus 100. The display apparatus 100 and the upgrade apparatus 200 include connectors/terminals 110 and 210 for physical/electrical connection to each other.

Unlike in the present exemplary embodiment, the upgrade apparatus 200 may be connected to the display apparatus 100 wirelessly. In this case, the upgrade apparatus 200 is supplied with operating power from a separate external power source or battery. However, the present exemplary embodiment is described with reference to a case where the upgrade apparatus 200 is connected to the display apparatus 100 via a cable.

The display apparatus 100 may process an image signal received from an external source or may process image data stored in a storage device according to a preset image processing process and display an image based on the image signal/image data. In the present exemplary embodiment, however, as the display apparatus 100 and the upgrade apparatus 200 are connected to each other, hardware/software of the display system 1 performing the image processing process may be upgraded, thereby providing a user with an image with relatively improved quality.

Figure 2:
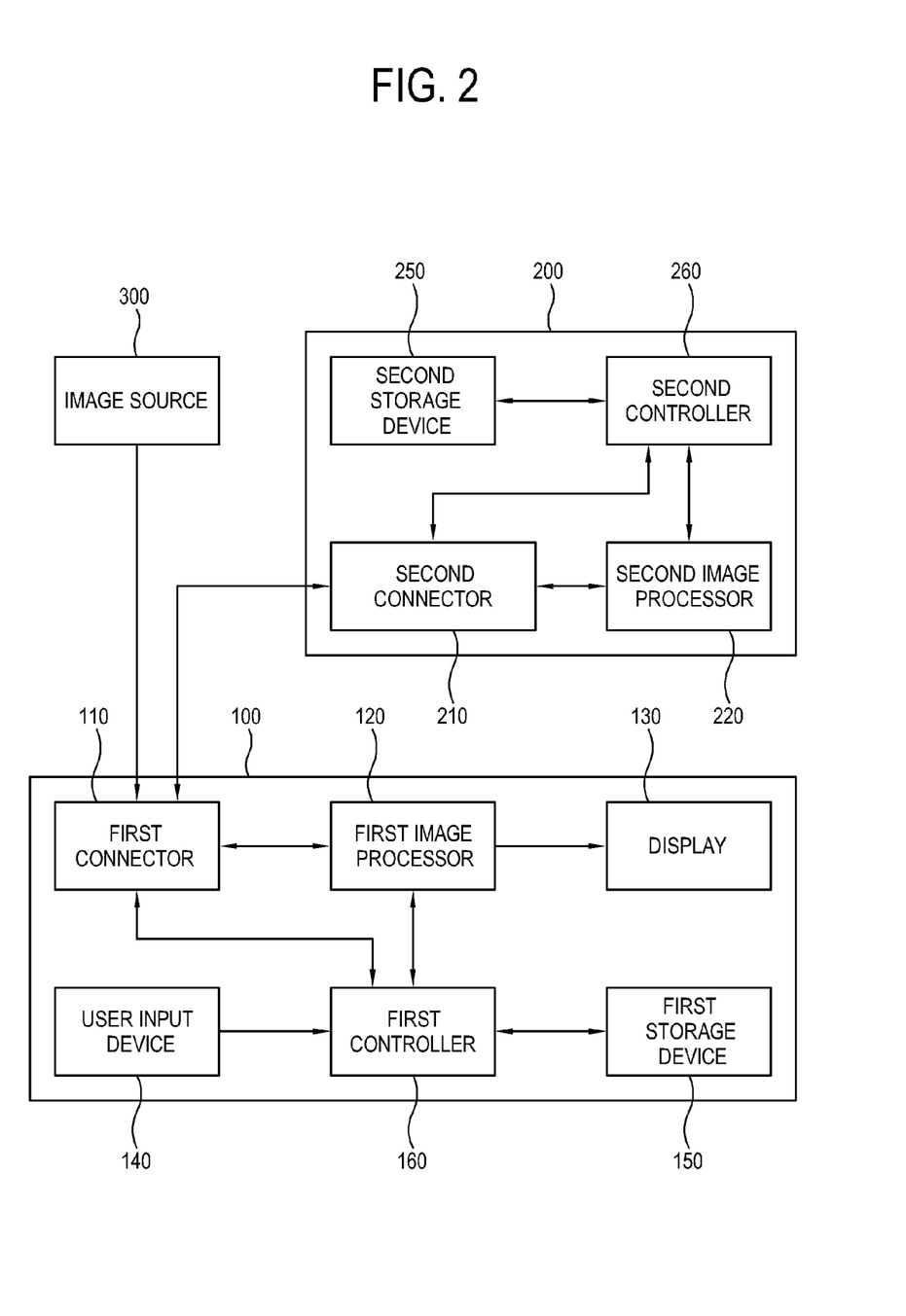
FIG. 2 is a block diagram of the display system of FIG. 1.

Hereinafter, configurations of the display apparatus 100 and the upgrade apparatus 200 will be described with reference to FIG. 2. FIG. 2 is a block diagram illustrating the configurations of the display apparatus 100 and the upgrade apparatus 200 constituting the display system 1.

As shown in FIG. 2, the display apparatus 100 includes a first connector 110 to which at least one image source 300 is connected, a first image processor 120 processing an image signal received from the image source 300 through the first connector 110, a display 130 displaying an image based on an image signal processed by the first image processor 120, a user input device 140 outputting a preset command according to manipulation by a user, a first storage device 150 storing data/information, and a first controller 160 controlling operations of all components of the display apparatus 100.

The first connector 110 transmits an image signal received from the at least one image source 300 to the first image processor 120. The first connector 110 may receive signals/data in accordance with one or more audio/video standards such as high definition multimedia interface (HDMI), DisplayPort, IEEE 1394 (FireWire), digital video interface (DVI), video graphics array (VGA), composite, S-Video, component, etc. The first connector may also receive data through a wired connection, such as a universal serial bus (USB), Ethernet, etc. or a wireless connection or over a network. The first connector may include a plurality of connection terminals (not shown) corresponding to the respective standards and connection types. Various external devices including the image source 300 may be connected to the connection terminals, thus enabling communication via the first connector 110.

That is, any external device capable of transmitting and receiving signals/data to and from the display apparatus 100 through the first connector 110 may be connected to the first connector 110, without being limited to the image source 300. In the present exemplary embodiment, the upgrade apparatus 200 may be connected to the first connector 110.

The first image processor 120 performs various preset image processing processes on an image signal received from the first connector 110. The first image processor 120 outputs a processed image signal to the display 130, so that an image based on the corresponding image signal is displayed on the display 130.

The first image processor 120 may perform any type of image processing, without being limited to, for example, demultiplexing to separate a signal into characteristic signals, decoding corresponding to an image format of an image signal, de-interlacing to convert an interlaced image signal into a progressive form, scaling to adjust an image signal to a preset resolution, noise reduction to improve image quality, detail enhancement, frame refresh rate conversion, or the like.

The first image processor 120 may be provided as an image processing board (not shown) in which a circuit system to conduct such processes, such as various chip sets (not shown), a memory (not shown), electronic components (not shown) and wiring (not shown), is mounted on a printed circuit board (PCB, not shown).

The display 130 displays an image based on an image signal output from the first image processor 120. The display 130 may be configured as one of various display types using liquid crystals, plasma, light emitting diodes, organic light emitting diodes, a surface conduction electron emitter, a carbon nano-tube, nano-crystals, or the like, without being limited thereto.

The display 130 may further include an additional element depending on a display mode thereof. For example, in a display mode using liquid crystals, the display 130 may include a liquid crystal display (LCD) panel, a backlight (not shown) providing light to the panel, and a panel drive board (not shown) driving the panel.

The user input 140 transmits various preset control commands or information to the first controller 160 by user's manipulation and input. The user input 140 may be provided as a menu key and an input panel installed on an outside of the display apparatus 100 or as a remote controller separate from the display apparatus 100.

Alternatively, the user input 140 may be configured as a single body with the display 130. That is, if the display 130 is a touch screen, a user may transmit a preset command to the first controller 160 through an input menu (not shown) displayed on the display 130.

The first storage device 150 may store data according to control by the first controller 160 in addition to the first apparatus information. The first storage device 150 may be configured as a nonvolatile memory, such as a flash memory, a hard disk drive, etc. The first storage device 150 is accessible by the first controller 160, and the data stored in the first storage device 150 may be read, recorded, revised, deleted, and/or updated by the first controller 160.

The first storage device 150 may store, for example, an operating system to run the display apparatus 100 and various applications, image data and optional data which are executable in the operating system.

The first controller 160 controls operations of various components of the display apparatus 100. For example, the first controller 160 implements an image processing process of the first image processor 120, transmission and reception of signals/information/data through the first connector 110, and a control operation corresponding to a command from the user input 140, thereby controlling all operations of the display apparatus 100.

The display apparatus 100 having such a configuration needs upgrading over time in order to allow user to take advantage of technology developments. Upgrading is necessary for various cases, for example, to receive an image signal in an additional format, to receive a higher quality image signal than is supported solely by the display apparatus 100, or to reduce system load of the display apparatus 100.

The display apparatus 100 is upgraded in terms of hardware and software. In the present exemplary embodiment, the upgrade apparatus 200 provided to upgrade the display apparatus 100 is connected to the first connector 110, thereby upgrading at least one of the existing hardware and software configurations of the display apparatus 100.

Exemplary embodiments have been described with reference to display apparatus 100 with an integrated display 130. Aspects of exemplary embodiments may also apply to any image processing apparatus, including an image processing apparatus without an integrated display, such as a set-top box, personal computer, etc.

The upgrade apparatus 200 includes hardware/software configurations corresponding to at least part of hardware/software resources of the display apparatus 100. These hardware/software configurations of the upgrade apparatus 200 are provided to perform more improved functions than the at least part of the resources of the display apparatus 100. When the upgrade apparatus 200 is connected to the display apparatus 100, the configurations of the upgrade apparatus 200 replace at least part of the existing resources of the display apparatus 100, thereby ultimately improving quality of an image displayed in the display apparatus 100.

Hereinafter, the configuration of the upgrade apparatus 200 will be described.

The upgrade apparatus 200 includes a second connector 210 connected to the first connector 110 of the display apparatus 100, a second image processor 220 capable of performing processes corresponding to at least part of the image processing processes of the first image processor 120, a second storage device 250 storing data/information, and a second controller 260 controlling all operations of the upgrade apparatus 200.

The second connector 210 is connected to the first connector 110, thereby enabling communication between the upgrade apparatus 200 and the display apparatus 100. The second connector 210 may be provided in a standard corresponding to the first connector 110. The first connector 110 may be connected to at least one connection terminal (not shown) among a plurality of connection terminals (not shown) of the first connector 110.

For example, the second connector 210 may be connected to an HDMI terminal (not shown) for transmission and reception of image signals between the display apparatus 100 and the upgrade apparatus 200 or be connected to a USB terminal (not shown) for transmission and reception of data and power. However, the first connector 110 and the second connector 210 may be connected in various modes, without being limited to the above examples.

The second image processor 220 may perform a second process corresponding to a first process, which is part of the processes performed by the first image processor 120 of the display apparatus 100. The terms "first process" and "second process" are named for convenience to distinguish processes and may be a single unit process or a plurality of unit processes. The second process is functionally improved as compared with the first process and is achieved by upgrading hardware, such as a chip set, or software, such as algorithms/executable codes/programs.

The second image processor 220 performs the second process, instead of the first process, according to control by the first controller 160 or the second controller 260 when the display apparatus 100 and the upgrade apparatus 200 are connected to each other. In this manner, the second process, which is more functionally improved than the first process, is implemented instead of the first process, thereby enhancing the image processing process overall, which will be described.

The second storage device 250 stores data. The second storage device 250 is configured as a nonvolatile memory, such as a flash memory and a hard disk drive. The second storage device 250 is accessed by the first controller 160 or the second controller 260, and the data stored in the second storage device 250 is read, recorded, revised, deleted, and/or updated by controller 160 and/or controller 260. Meanwhile, the first storage device 150 may also be accessed by not only the first controller 160 but the second controller 260 depending on a configuration thereof.

The second controller 260 controls connection of the display apparatus 100 and the upgrade apparatus 200 to perform a general image processing process. The second controller 260 and the first controller 160 may be configured as a hardware processor such as a central processing unit (CPU). If the second controller 260 performs a more improved function than the first controller 160, the second controller 260 may disable the first controller 160 and control all operations of the display system 1 instead of the first controller 160. Alternatively, the second controller 260 may control all operations of the display system 1 together with the first controller 160.

Figure 3:
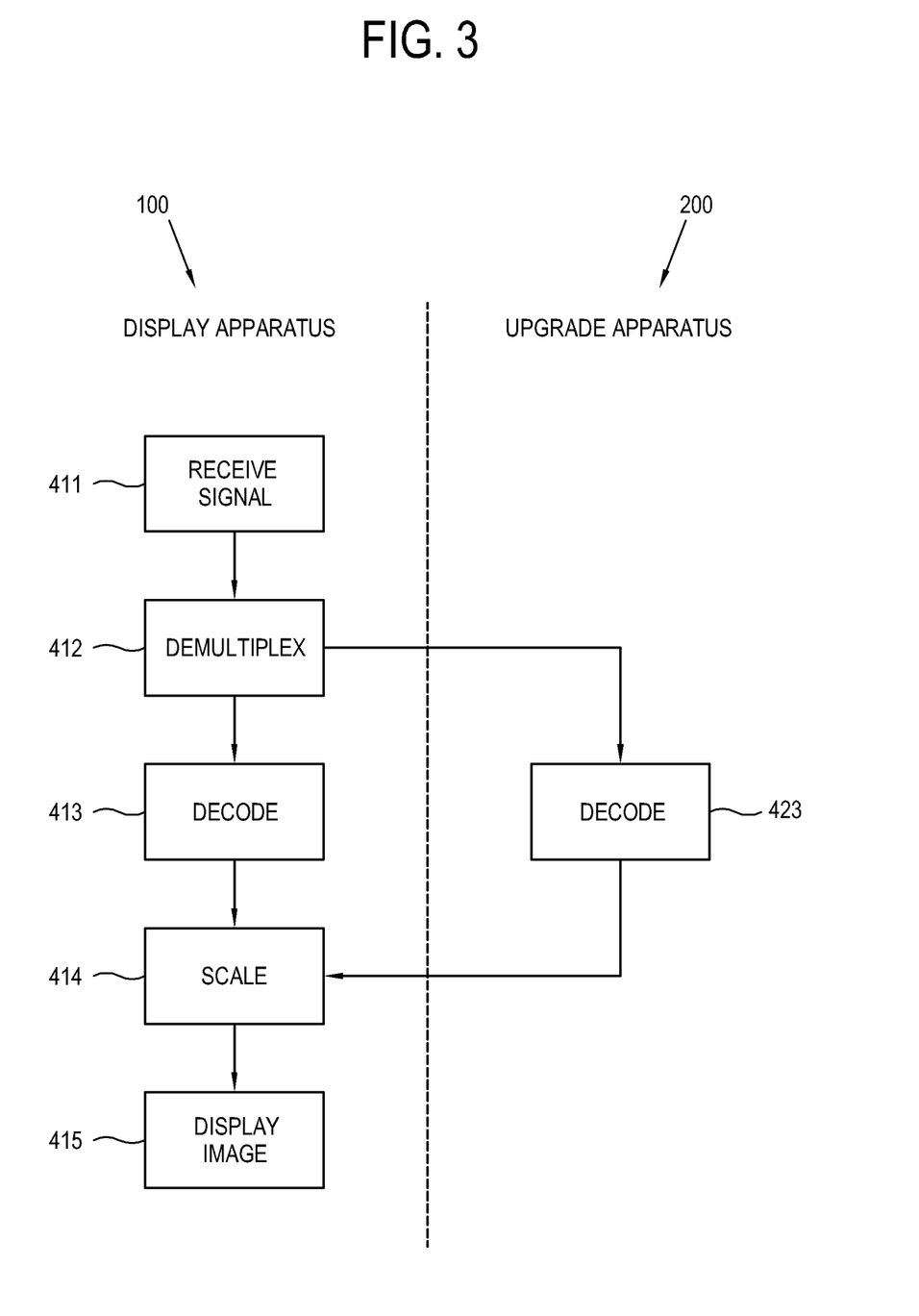
FIG. 3 and FIG. 4 are flowcharts illustrating an exemplary embodiment of a method of an upgrade apparatus upgrading an image processing process of a display apparatus in the display system of FIG. 1.

Hereinafter, a case where the display apparatus 100 is upgraded by the upgrade apparatus 200 will be described with reference to FIG. 3. FIG. 3 is a flowchart illustrating a method of the upgrade apparatus 200 upgrading an image processing process of the display apparatus 100 in the display system 1 according to the present exemplary embodiment.

As shown in FIG. 3, when receiving a signal, e.g., a broadcast signal, from the image source 300 (411), the display apparatus 100 processes the signal according to a preset sequence of image processing processes 412, 413 and 414. FIG. 3 shows just some illustrative image processing processes 412, 413 and 414 but does not provide all image processing processes actually implemented by the display apparatus 100 for concise description of the present exemplary embodiment.

The display apparatus 100 performs demultiplexing to separate a received broadcast signal into an image signal, an audio signal, and optional data (412). The display apparatus 100 processes the respective demultiplexed signals, for example, decodes the image signal into a preset image format (413). The display apparatus 100 scales the decoded image signal to predetermined resolution so as to be displayed as an image on the display 130 (414) and displays an image based on the scaled image signal (415).

Among these processes, the upgrade apparatus 200 is provided to perform a process 423 corresponding to the decoding process of the display apparatus 100. The decoding process 423 performed by the upgrade apparatus 200 is the same in terms of action as the decoding process performed by the display apparatus 100 but is functionally improved as compared with the decoding process 413 of the display apparatus 100. Thus, performing the decoding process 423 instead of the decoding process 413 improves the image processing processes.

For example, the decoding process 423 can process an image signal with high resolution or an image signal in a format which cannot be handled with the decoding process 413, or apply an additional effect to an image signal, which is not realized with the decoding process 413.

Accordingly, in the sequence of the image processing processes according to the present exemplary embodiment, the decoding process 423 of the upgrade apparatus 200 is carried out after demultiplexing 412 instead of the decoding process 413 of the display apparatus 100 according to control by the first controller 160 or the second controller 260. After the decoding process 423 of the upgrade apparatus 200, scaling (414) is carried out.

According to the sequence, the display apparatus 100 and the upgrade apparatus 200 transmit and receive image signals and control signals to and from each other, which is realized according to control by the first controller 160 or the second controller 260.

Figure 4:
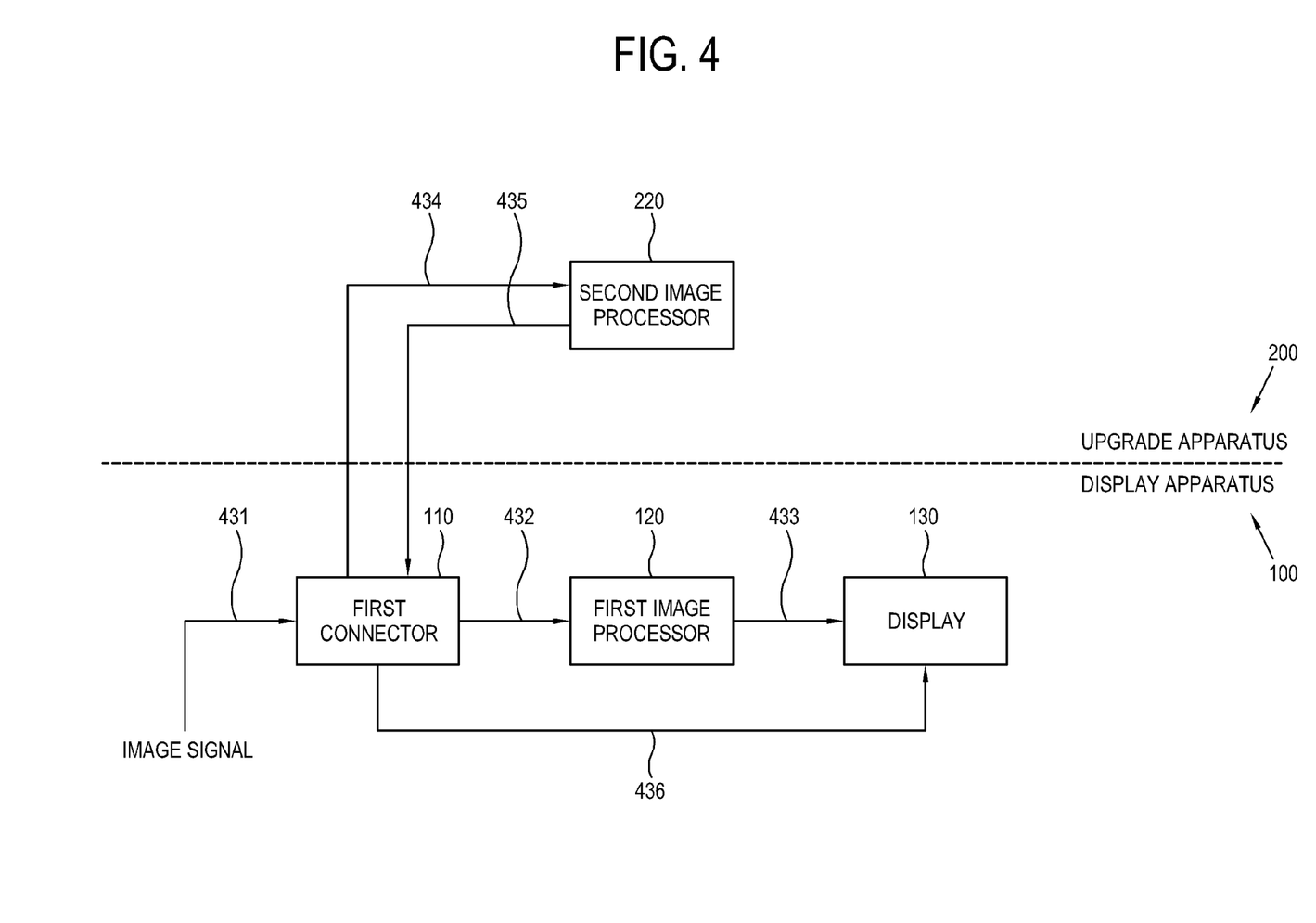

Unlike in FIG. 3 where part of the image processing processes is replaced, the second image processor 20 of the upgrade apparatus 200 may replace the first image processor 120 of the display apparatus 100, which will be described with reference to FIG. 4. FIG. 4 is a block diagram illustrating a process of transmitting an image signal received to the first connector 110 in the display system 1 according to the present exemplary embodiment.

As shown in FIG. 4, if the upgrade apparatus 200 is not connected to the display apparatus 100, an image signal is received to the first connector 110 (431) and then transmitted to the first image processor 120 (432). The first image processor 120 processes the image signal and outputs the processed signal to the display 130 (433), and accordingly the display 130 displays an image based on the image signal processed by the first image processor 120.

Meanwhile, if the upgrade apparatus 200 is connected to the display apparatus 100, an image signal is received to the first connector 110 (431) and then transmitted to the second image processor 220, not to the first image processor 120 (434). The second image processor 220 performs an image processing process on the image signal instead of the first image processor 120, and the image signal processed by the second image processor 220 is transmitted back to the display apparatus 100 (435).

The image signal is transmitted to the display 130, bypassing the first image processor 120 (436), and accordingly the display 130 displays an image based on the image signal processed by the second image processor 220.

Meanwhile, if the display apparatus 100 and the upgrade apparatus 200 are connected to each other, the second controller 260 may disable the first controller 160 and control the first image processor 120 and the second image processor 220. Alternatively, if the operating system stored in the second storage device 250 is a more upgraded version than the operating system stored in the first storage device 150, the operating system of the first storage device 150 may be updated to the operating system of the second storage device 250 to run the updated operating system, or the operating system of the second storage device 250 may be run instead of the operating system of the first storage device 150.

With this configuration, the upgrade apparatus 200 according to the present exemplary embodiment may upgrade the display apparatus 100.

Figure 5:
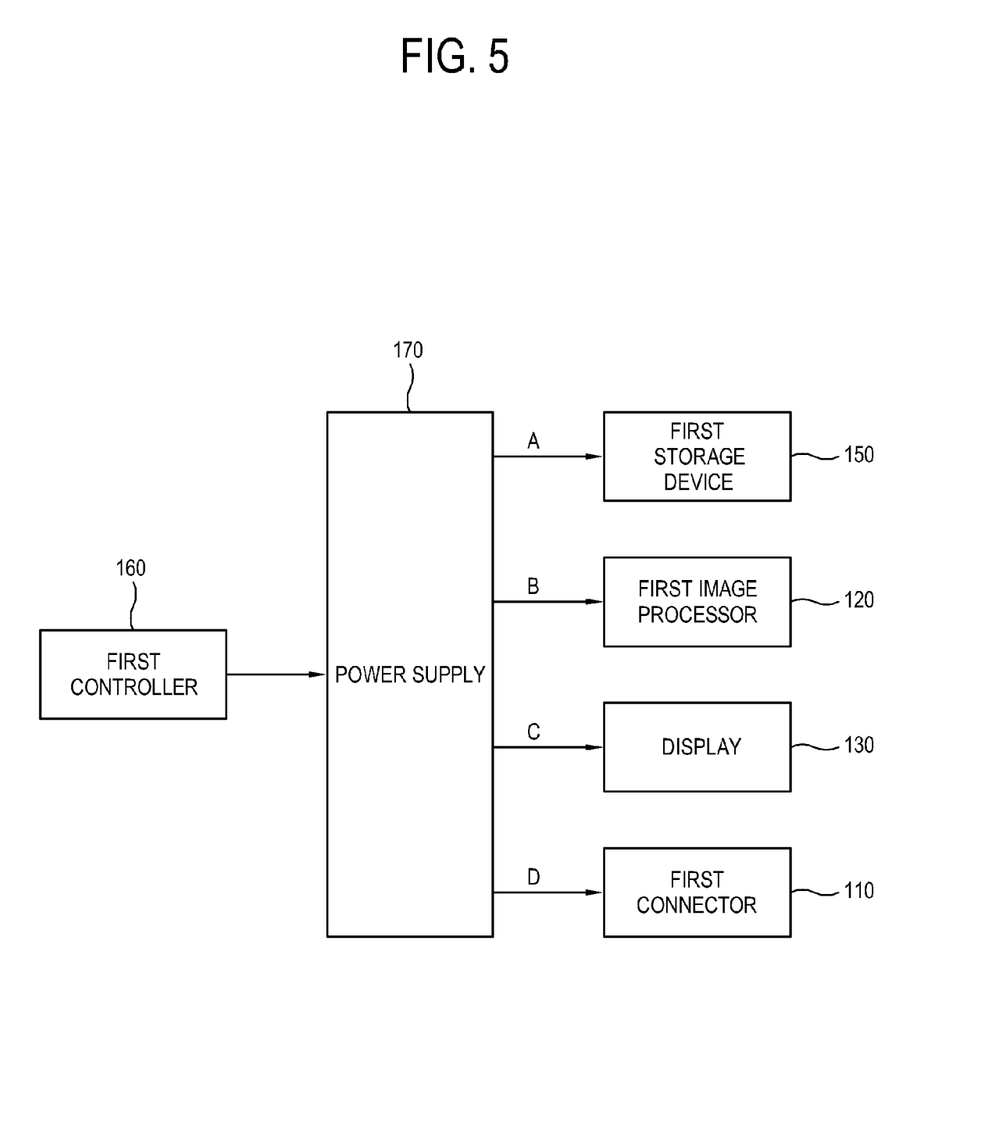
FIG. 5 illustrates an exemplary embodiment of a sequence of supplying power of the display apparatus in booting with the display apparatus and the upgrade apparatus not connected to each other.

Hereinafter, in this structure of the display apparatus 100 and the upgrade apparatus 200, a method of supplying system power when the display system 1 is booted up will be described with reference to FIG. 5. FIG. 5 illustrates a sequence of supplying power of the display apparatus 100 when the display system 1 is booted up with the display apparatus 100 and the upgrade apparatus 200 not connected to each other.

Here, the display apparatus 100 further includes a power supply 170 controlled by the first controller 160 and supplying system power of the display apparatus 100. The power supply 170 provides operation power to all of the components of the display apparatus 100, e.g., the first connector 110, the first image processor 120, and the display 130.

If the display apparatus 100 is booted up without the upgrade apparatus 200 connected to the display apparatus 100, power from the power supply 170 is sequentially supplied to the respective components according to a preset sequence. Here, the following sequence is provided for illustrative purposes only.

For example, when the display apparatus 100 is booted up by turning on the system power of the display apparatus 100, the first controller 160 may control power from the power supply 170 to be supplied to the first storage device 150 (A). The first storage device 150 stores various reference data for booting, and the first controller 160 may supply power to the whole of the first storage device 150 or a particular domain of the first storage device 150 where such data is stored and read out the corresponding data. The first controller 160 proceeds with a booting process, referring to the read data.

The first controller 160 may then supply power to the first image processor 120 (B) and then to the display 130 (C). Finally, the first controller 160 may supply power to the first connector 10 to communicate with the outside (D). As describe above, when the display apparatus 100 is booted up alone, a power supply sequence is such that internal components of the display apparatus 100 are supplied in priority order.

In this sequence, the first image processor 120 is supplied with power before the first connector 110 in order to display images first when the display apparatus 100 is booted up.

Thus, in a boot process, power is supplied to the first image processor 120 processing an image, the display 130 displaying an image, and the first connector 110 connected to the outside in order, and accordingly the display apparatus 100 may provide an image to a user at the earliest possible time after booting up.

However, if the sequence of FIG. 5 is applied when the display system 1 is booted up with the upgrade apparatus 200 connected to the display apparatus 100, the following problem may arise.

The upgrade apparatus 200 is supplied with power of the power supply 170 through the first connector 110 in a boot process. However, according to the foregoing sequence, the first connector 110 has the lowest priority in the power supply sequence, and thus the second image processor 220 is supplied with power last.

Upgrading the display apparatus 100 by the upgrade apparatus 200 includes performing an image processing process by the first image processor 220. Thus, if power supply is carried out according to the above sequence in the boot process with the display apparatus 100 and the upgrade apparatus 200 connected to each other, image processing is delayed to cause a delay in displaying an image. That is, a boot process is delayed.

Thus, when the display apparatus 100 is booted, the first controller 160 of the display apparatus 100 controls the power supply 170 to supply power first to the upgrade apparatus 200 according to connection of the upgrade apparatus 200 to the first connector 110. Accordingly, booting time may be minimally delayed with the display apparatus 100 and the upgrade apparatus 200 connected to each other.

Figure 6:
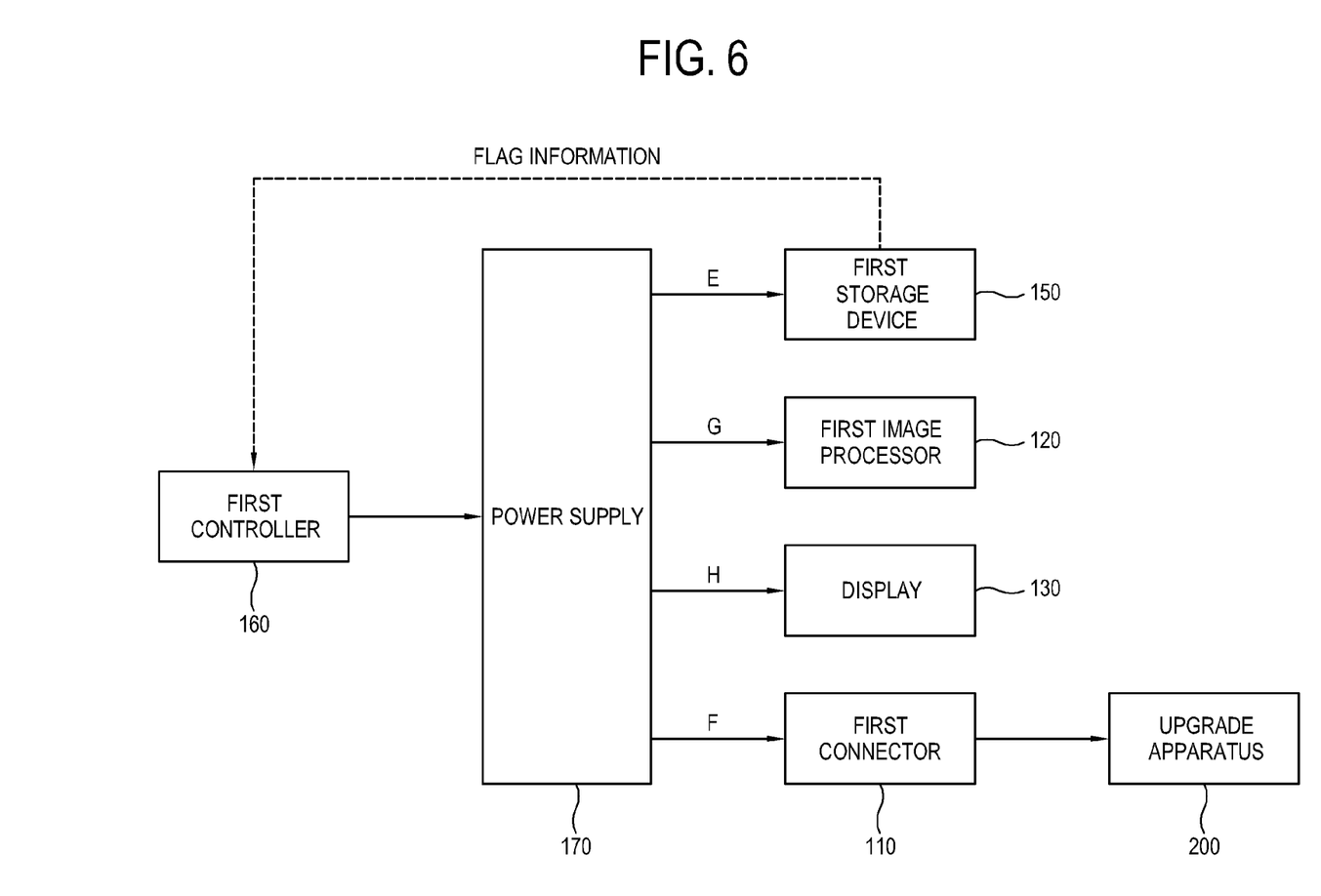
FIG. 6 illustrates an exemplary embodiment of a sequence of supplying the power of the display apparatus in booting with the display apparatus and the upgrade apparatus connected to each other.

Hereinafter, a method of supplying power first to the upgrade apparatus 200 in booting with the display apparatus 100 and the upgrade apparatus 200 connected will be described with reference to FIG. 6. FIG. 6 shows a sequence of supplying power of the display apparatus 100 during a boot-up process with the display apparatus 100 and the upgrade apparatus 200 connected to each other.

As shown in FIG. 6, when system power of the display apparatus 100 is turned on with the display apparatus 100 and the upgrade apparatus 200 connected to each other, booting starts.

The first controller 160 enables power to be supplied to the first storage device 150 (E) and reads out reference data for booting from the first storage device 150. According to the present exemplary embodiment, the data read out from the first storage device 150 includes flag information indicating whether the display apparatus 100 and the upgrade apparatus 200 are connected to each other.

The flag information is constructed so as to indicate whether the upgrade apparatus 200 is connected to the first connector 110 when the display apparatus 100 operates prior to the current booting process. The flag information is stored in the first storage device 150 by the first controller 160 or the second controller 260. If the upgrade apparatus 200 is not connected to the first connector 110, the flag information is not stored in the first storage device 150.

When the flag information is read out from the first storage device 150, the first controller 160 determines that the upgrade apparatus 200 is connected to the first connector 110. Then, the first controller 160 controls the power supply 170 to supply power to the first connector 110 (F) according to a different sequence from the power supply sequence of FIG. 5. Accordingly, power provided from the power supply 170 is supplied to the upgrade apparatus 200 through the first connector 110, and the upgrade apparatus 200 is turned on.

Next, the first controller 160 supplies power to the first image processor 120 (G) and then to the display 130 (H).

According to this process, the upgrade apparatus 200 is first supplied with power in booting, thereby performing an upgrade operation to process an image signal at the earlier time than in the case of FIG. 5. Accordingly, a delay in booting due to connection of the display apparatus 100 and the upgrade apparatus 200 may be minimized.

The present exemplary embodiment has been described with reference to a case where power is supplied first to the entire first connector 110 (F). Here, if the first connector 110 includes a plurality of connection terminals (not shown), power may be controlled to be supplied first to a connection terminal connected to the upgraded apparatus 200 only.

In this case, the first controller 160 controls the power supply 170 to supply power only to a connection terminal to which the upgrade apparatus 200 is connected among the connection terminals of the first connector 110 in operation F. Further, the first controller 160 supplies power to the remaining connection terminals not connected to the upgrade apparatus 200 after operation H.

Figure 7:
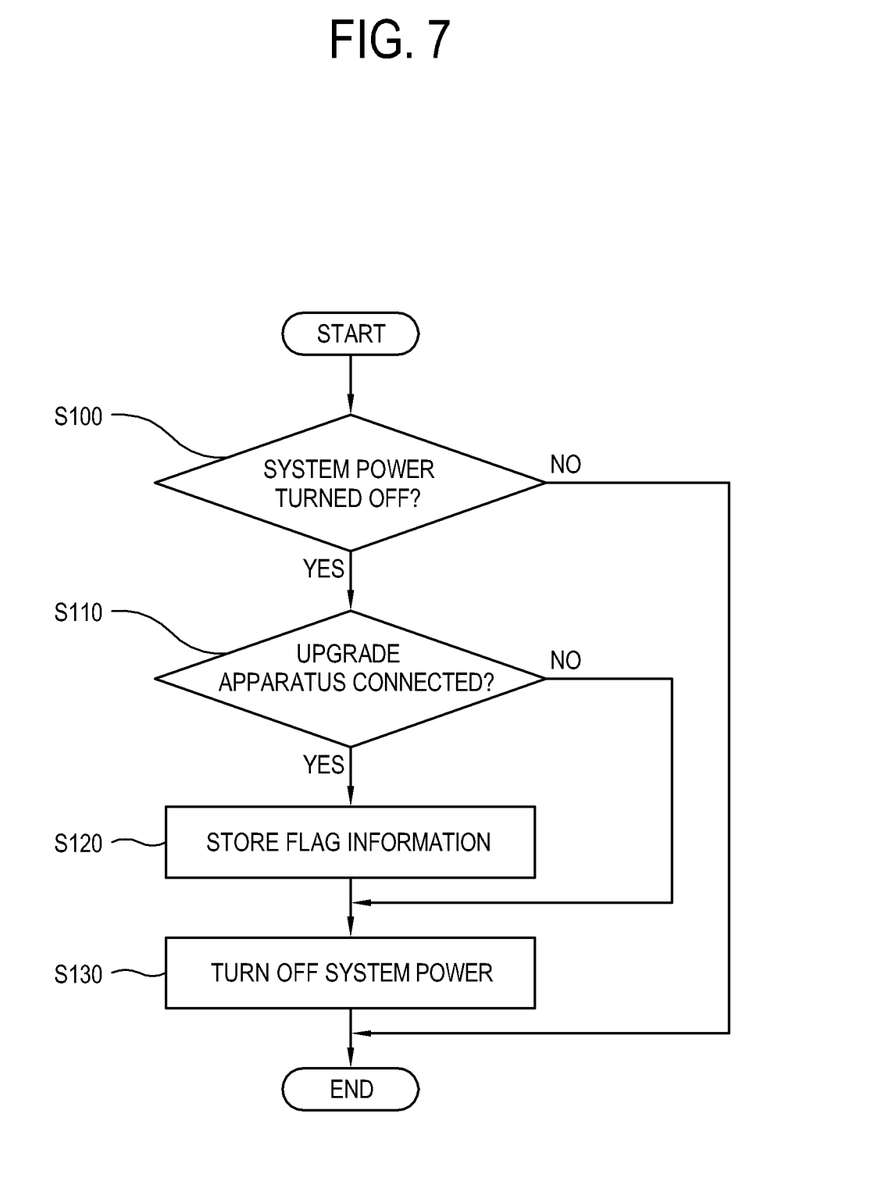
FIG. 7 is a flowchart illustrating an exemplary embodiment of a process of storing flag information in the display apparatus of FIG. 1.

Hereinafter, a process of storing flag information in the display apparatus 100 according to the present exemplary embodiment will be described with reference to FIG. 7. FIG. 7 is a flowchart illustrating the process. Here, an initial state is defined as a state that the system power of the display apparatus 100 is turned on.

In the present exemplary embodiment, the first controller 160 is responsible for conducting an operation, but the second controller 260 may be responsible for conducting an operation depending on an operation mode.

As shown in FIG. 7, when system power is turned off through the user input 140 (S100), the first controller 160 determines whether the upgrade apparatus 200 is currently connected to the display apparatus 100 (S110).

If it is determined that the upgrade apparatus 200 is connected to the display apparatus 100, the first controller 160 stores flag information in the first storage device (S120).

If it is determined that the upgrade apparatus 200 is not connected to the display apparatus 100, the first controller 160 does not store flag information. When the upgrade apparatus 200 is not connected to the display apparatus 100, the second controller 260 can not be responsible for conducting an operation, and thus the flag information is not stored either in this case.

When the flag information is stored, the first controller 160 turns off the system power (S130).

According to this process, the flag information indicating connection of the display apparatus 100 and the upgrade apparatus 200 is stored in the display apparatus 100.

Figure 8:
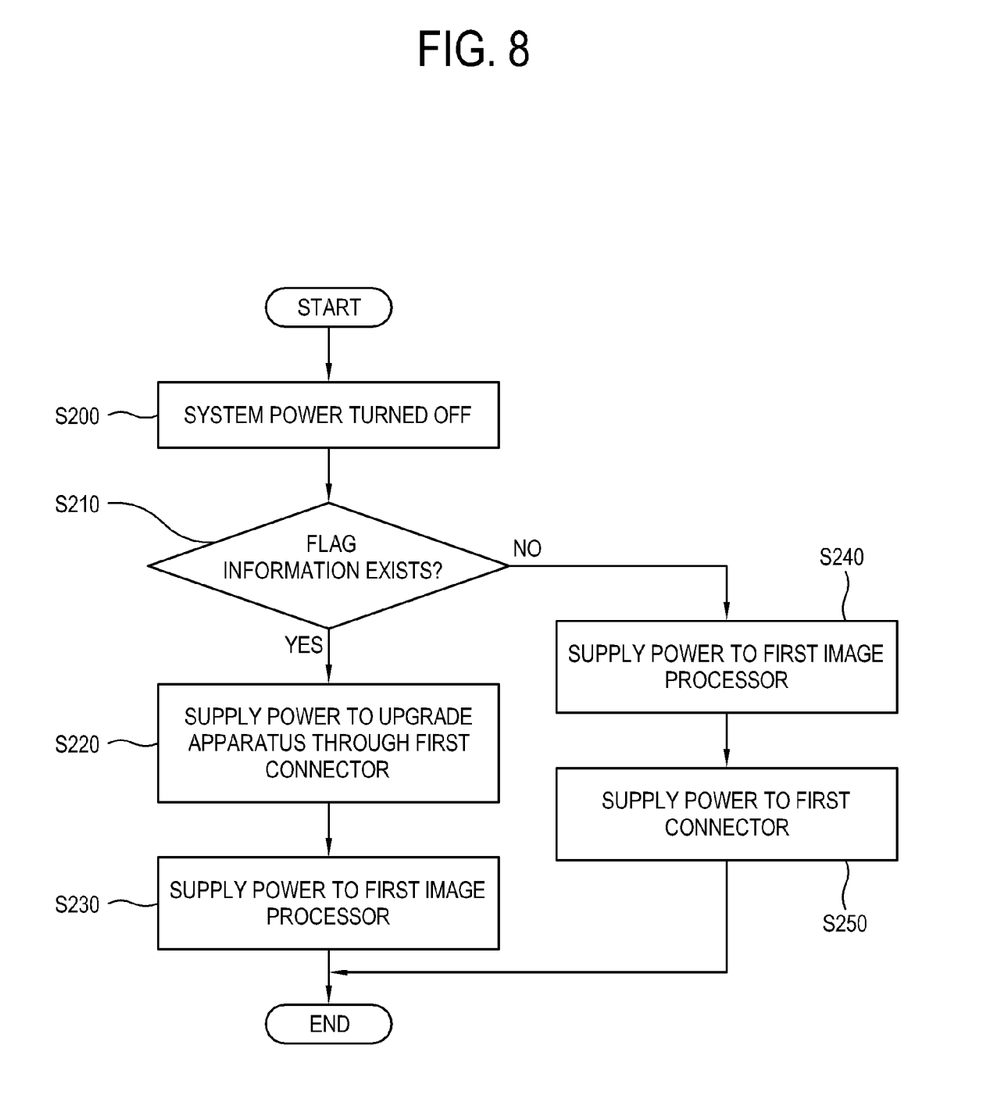
FIG. 8 is a flowchart illustrating an exemplary embodiment of a process of supplying power of the display apparatus of FIG. 1 when booting starts.

Hereinafter, a process of supplying power of the display apparatus 100 when booting starts will be described with reference to FIG. 8. FIG. 8 is a flowchart illustrating the process.

As shown in FIG. 8, when system power is turned on (S200), the first controller starts booting the display apparatus 100.

The first controller 160 determines whether flag information is stored in the display apparatus 100 (S210).

If the flag information is stored, the first controller 160 determines that the upgrade apparatus 200 is connected to the display apparatus 100. The first controller 160 supplies power to the first controller 110, thereby providing power to the upgrade apparatus 200 through the first connector 110 (S220). Then, the first controller 160 supplies power to the first image processor 120 (S230).

If the flag information is not stored, the first controller 160 determines that the upgrade apparatus 200 is not connected to the display apparatus 100. The first controller 160 supplies power to the first image processor 120 (S240) and then to the first connector 110 (S250).

In this manner, when power supply is completed, an image is displayed by an image processing process performed by the display apparatus 100 alone or an image processing process performed through the upgrade apparatus 200 upgrading the display apparatus 100, and booting is completed.

According to the above process, a relative delay in booting which arises when the display apparatus 100 and the upgrade apparatus 200 are connected may be minimized.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a display;
   a first image processor which processes an image signal received from an image source;
   a connector which provides a connection to an upgrade apparatus, wherein the upgrade apparatus comprises a second image processor which processes the image signal received from the image source, the second image processor being an upgraded image processor of the first image processor;
   a power supply which supplies power to the display apparatus; and
   a controller which, in a booting mode, controls the power supply to supply power to the first image processor and to the connector in sequence in response to a determination that the upgrade apparatus is not connected to the connector, and controls the power supply to supply power to the connector and to the first image processor in sequence in response to a determination that the upgrade apparatus is connected to the connector.

2. The display apparatus of claim 1, wherein the controller controls the power supply to supply power to the first image processor before supplying power to the connector in response to the determination that the upgrade apparatus is not connected to the connector, and the controller controls the power supply to supply power to the connector before supplying power to the first image processor in response to the determination that the upgrade apparatus is connected to the connector.

3. The display apparatus of claim 2, wherein the controller stores flag information indicating whether the upgrade apparatus is connected to the connector in response to the display apparatus receiving a signal to turn off, and the controller determines whether the upgrade apparatus is connected to the connector according to whether the flag information is stored when the display apparatus starts booting.

4. The display apparatus of claim 3, wherein the controller determines that the upgrade apparatus is connected to the connector when there is the flag information at a time that the display apparatus starts booting, and the controller determines that the upgrade apparatus is not connected to the connector when there is no flag information at the time that the display apparatus starts booting.

5. The display apparatus of claim 2, wherein the connector comprises a plurality of connection terminals, and the controller controls the power supply to supply power to at least one connection terminal connected to the upgrade apparatus before supplying power to the first image processor in response to the determination that the upgrade apparatus is connected to the connector.

6. The display apparatus of claim 1, wherein:
   an upgrade apparatus performs a second process,
   the preset image processing process comprises a first process performed by the first image processor, and
   the controller controls the upgrade apparatus to perform the second process and controls the first image processor not to perform the first process in response to a determination that the upgrade apparatus is connected to the connector.

7. An upgrade apparatus of a display apparatus comprising:
   a connector which provides a connection to the display apparatus, the display apparatus comprises a first image processor which processes an image signal received from an image source and a first controller which controls the display apparatus;
   a second image processor which processes an image signal received from the image source, the second image processor being an upgraded image processor of the first image processor; and
   a second controller which communicates with the first controller to control the display apparatus, the first controller, in a booting mode, controls a power supply to supply power to the first image processor and to the connector in sequence in response to a determination that the display apparatus and the upgrade apparatus are not connected to each other, and the first controller controls the power supply to supply power to the connector and to the first image processor in sequence in response to a determination that the display apparatus and the upgrade apparatus are connected to each other.

8. The upgrade apparatus of claim 7, wherein the display apparatus comprises an apparatus connector which provides a connection to the upgrade apparatus, and the first image processor performs a preset image processing process, and the controller controls the power supply of the display apparatus to supply power of the display apparatus to the upgrade apparatus through the apparatus connector before supplying power to the first image processor in response to the determination that the upgrade apparatus is connected to the display apparatus, and the controller controls the power supply of the display apparatus to supply power of the display apparatus to the first image processor before supplying power to the apparatus connector in response to the determination that the display apparatus and the upgrade apparatus are not connected to each other.

9. The upgrade apparatus of claim 8, wherein the controller stores flag information indicating whether the upgrade apparatus is connected to the apparatus connector when the display apparatus receives a signal to turn off.

10. The upgrade apparatus of claim 8, wherein the apparatus connector comprises a plurality of connection terminals, and the controller controls the power supply of the display apparatus to supply power to at least one connection terminal connected to the connector among the connection terminals before supplying power to the first image processor in response to the determination that the upgrade apparatus is connected to the apparatus connector.

11. The upgrade apparatus of claim 7, wherein the second image processor performs a second process, a preset image processing process comprises a first process performed by the first image processor, and the controller controls the upgrade apparatus to perform, by the second image processor, the second process and controls the first image processor not to perform the first process in response to a determination that the display apparatus is connected to the connector.

12. A control method of a display apparatus comprising a display and a first image processor which processes an image signal received from an image source, the control method comprising:

connecting an upgrade apparatus, the upgrade apparatus comprising a second image processor which processes the image signal received from the image source, the second image processor is an upgraded image processor of the first image processor, to a connector of the display apparatus;

supplying the power of the display apparatus, in a booting mode, to the first image processor and to the connector in sequence in response to a determination that the upgrade apparatus is not connected to the connector, and supplying the power to the connector and to the first image processor in sequence in response to a determination that the upgrade apparatus is connected to the connector.

13. The control method of claim 12, wherein the supplying the power of the display apparatus to the upgrade apparatus comprises:

supplying the power of the display apparatus to the upgrade apparatus through the connector before supplying power to the first image processor in response to the determination that the upgrade apparatus is connected to the connector, and supplying the power of the display apparatus to the first image processor before supplying power to the connector in response to the determination that the upgrade apparatus is not connected to the connector.

14. The control method of claim 13, further comprising:

storing flag information indicating whether the upgrade apparatus is connected to the connector in response to a signal to turn off power of the display apparatus, wherein the determining whether the upgrade apparatus is connected to the connector comprises determining whether the upgrade apparatus is connected to the connector according to whether the flag information indicating that the upgrade apparatus is connected to the connector is stored.

15. The control method of claim 14, wherein the determining whether the upgrade apparatus is connected to the connector according to whether the flag information indicating that the upgrade apparatus is connected to the connector is stored comprises:

determining, when the display apparatus starts booting, that the upgrade apparatus is connected to the connector in response to a determination that flag information indicating that the upgrade apparatus is connected to the connector was stored, and determining, when the display apparatus starts booting, that the upgrade apparatus is not connected to the connector in response to a determination that flag information indicating that the upgrade apparatus is connected to the connector was not stored.

16. The control method of claim 13, wherein the connector comprises a plurality of connection terminals, and the supplying power of the display apparatus to the upgrade apparatus through the connector before supplying power to the first image processor comprises supplying power to at least one connection terminal connected to the upgrade apparatus among the connection terminals before supplying power to the first image processor.

17. The control method of claim 12, wherein the upgrade apparatus performs a second process, a preset image processing process comprises a first process performed by the first image processor, and upgrading the preset image processing process comprises performing, by the upgrade apparatus, the second process instead of performing, by the first image processor, the first process.

18. A control method of an upgrade apparatus of a display apparatus, the control method comprising:

connecting the upgrade apparatus to the display apparatus, the display apparatus comprises a first image processor which processes an image signal received from an image source and a first controller which controls the display apparatus;

processing the image signal received from the image source by a second image processor, the second image processor is an upgraded image processor of the first image processor, when the upgrade apparatus is connected to the display apparatus;

receiving power of the display apparatus when the display apparatus and the upgrade apparatus are connected to each other; and communicating with the first controller to select the second image processor to display the image signal received from the image source.

19. The control method of claim 18, wherein the display apparatus comprises an apparatus connector which provides a connection to the upgrade apparatus and the first image processor performs a preset image processing process, the supplying power of the display apparatus first to the upgrade apparatus comprises supplying power of the display apparatus to the upgrade apparatus through the apparatus connector before supplying power to the first image processor in the display apparatus when the display apparatus and the upgrade apparatus are connected to each other, and supplying power of the display apparatus to the first image processor before supplying power to the apparatus connector when the display apparatus and the upgrade apparatus are not connected to each other.

20. The control method of claim 19, further comprising: storing flag information indicating whether the display apparatus and the upgrade apparatus are connected to each other and turning off power of the display apparatus in response to a signal to turn off the power of the display apparatus.

21. The control method of claim 19, wherein the apparatus connector comprises a plurality of connection terminals, and the supplying power of the display apparatus to the upgrade apparatus comprises supplying power to at least one connection terminal connected to the upgrade apparatus among the connection terminals before supplying power to the first image processor.

22. The control method of claim 18, wherein the upgrade apparatus performs a second process,
- a preset image processing process comprises a first process performed by the first image processor, and
- upgrading the preset image processing process comprises performing, by the upgrade apparatus, the second process instead of performing, by the display apparatus, the first process.

23. A display system comprising:
- a display apparatus comprising a display, a first image processor which processes an image signal received from an image source, a connector which provides connections to external devices, a controller and a power supply which supplies power of the display apparatus; and
- an upgrade apparatus, connected to the connector, which comprises a second image processor which processes an image signal received from the image source, the second image processor is an upgraded image processor of the first image processor,
- wherein the power supply, in a booting mode, supplies power to the upgrade apparatus through the connector before supplying power to the first image processor in response to a determination that the upgrade apparatus is connected to the display apparatus,
- wherein the controller controls the display apparatus to display the image signal from the second image processor to the display in response to the determination that the upgrade apparatus is connected to the display apparatus.

24. An image processing apparatus, comprising
- a display;
- a first image processor which processes an image signal received from an image source;
- a connector which provides a connection to an upgrade apparatus, wherein the upgrade apparatus comprises a second image processor which processes the image signal received from the image source, the second image processor is an upgraded image processor of the first image processor;
- a power supply which supplies power to the image processing apparatus; and
- a controller, in a booting mode, which controls the power supply to supply power to the upgrade apparatus through the connector before supplying power to the first image processor in response to a determination that the upgrade apparatus is connected to the connector.

25. The image processing apparatus of claim 24, wherein the controller controls the power supply to supply power to the image processor before supplying power to the connector in response to the determination that the upgrade apparatus is not connected to the connector, and the controller controls the power supply to supply power to the connector before supplying power to the image processor in response to the determination that the upgrade apparatus is connected to the connector.

26. The image processing apparatus of claim 25, wherein the controller stores flag information indicating whether the upgrade apparatus is connected to the connector in response to the image processing apparatus receiving a signal to turn off, and the controller determines whether the upgrade apparatus is connected to the connector according to whether the flag information is stored when the image processing apparatus starts booting.

* * * * *